(12) United States Patent
Wang et al.

(10) Patent No.: US 12,218,429 B2
(45) Date of Patent: Feb. 4, 2025

(54) ANTENNA ASSEMBLY AND BASE STATION ANTENNA

(71) Applicant: Outdoor Wireless Networks LLC, Claremont, NC (US)

(72) Inventors: Xiaotuo Wang, Suzhou (CN); Shuguang Shao, Suzhou (CN)

(73) Assignee: Outdoor Wireless Networks LLC, Claremont, NC (US)

( * ) Notice: Subject to any disclaimer, the term of this patent is extended or adjusted under 35 U.S.C. 154(b) by 276 days.

(21) Appl. No.: 17/905,286

(22) PCT Filed: Mar. 8, 2021

(86) PCT No.: PCT/US2021/021346
§ 371 (c)(1),
(2) Date: Aug. 30, 2022

(87) PCT Pub. No.: WO2021/188317
PCT Pub. Date: Sep. 23, 2021

(65) Prior Publication Data
US 2023/0019212 A1      Jan. 19, 2023

(30) Foreign Application Priority Data
Mar. 18, 2020   (CN) .......................... 202010191740.3

(51) Int. Cl.
*H01Q 21/00*   (2006.01)
*H01Q 1/24*    (2006.01)
(Continued)

(52) U.S. Cl.
CPC ......... *H01Q 21/0075* (2013.01); *H01Q 1/246* (2013.01); *H01Q 1/38* (2013.01);
(Continued)

(58) Field of Classification Search
CPC ...... H01Q 1/246; H01Q 1/38; H01Q 21/0075; H01Q 3/267; H01Q 19/10; H04B 17/12
See application file for complete search history.

(56) References Cited

U.S. PATENT DOCUMENTS

| | | | |
|---|---|---|---|
| 8,604,987 B1 * | 12/2013 | Doane ................. | H01Q 21/061 343/893 |
| 10,861,803 B1 * | 12/2020 | Vaisman ............. | H01L 23/3677 |

(Continued)

FOREIGN PATENT DOCUMENTS

| CN | 110350320 A | * | 10/2019 | ............... H01Q 1/38 |
|---|---|---|---|---|
| CN | 211376931 U |   | 8/2020 | |
| CN | 113161718 A | * | 7/2021 | |

OTHER PUBLICATIONS

International Search Report and the Written Opinion of the International Searching Authority corresponding to International Patent Application No. PCT/US2021/021346 (11 pages) (mailed May 28, 2021).

*Primary Examiner* — Seokjin Kim
(74) *Attorney, Agent, or Firm* — Myers Bigel, P.A.

(57) ABSTRACT

The present invention relates to an antenna assembly. The antenna assembly comprises a feed board, a backplane, and a calibration board. A plurality of radiating elements are mounted on the feed board and extend forwardly from the feed board. The feed board is mounted on a first major surface of the backplane, and the calibration board is mounted on a second major surface of the backplane opposite the first major surface. The antenna assembly further includes a conductive structure, which extends through openings in at least two of the feed board, the backplane and the calibration board so as to electrically connect a first transmission line on the calibration board with a second transmission line on the feed board. The antenna assembly according to embodiments of the present invention can also (Continued)

achieve high integration and miniaturization of the overall antenna construction. Further, the present invention relates to a base station antenna comprises an antenna assembly.

16 Claims, 8 Drawing Sheets

(51) Int. Cl.
    *H01Q 1/38*    (2006.01)
    *H01Q 1/42*    (2006.01)
    *H01Q 3/26*    (2006.01)
    *H04B 17/12*   (2015.01)

(52) U.S. Cl.
    CPC ............... *H01Q 1/42* (2013.01); *H01Q 3/267* (2013.01); *H04B 17/12* (2015.01)

(56) References Cited

U.S. PATENT DOCUMENTS

| | | | |
|---|---|---|---|
| 11,233,339 B2* | 1/2022 | Jamaly | H01Q 1/52 |
| 2012/0119969 A1 | 5/2012 | MacDonald et al. | |
| 2019/0123443 A1* | 4/2019 | Russell | H01Q 1/22 |
| 2019/0190127 A1 | 6/2019 | Bryce | |
| 2019/0334636 A1* | 10/2019 | Li | G01R 29/10 |
| 2020/0196444 A1* | 6/2020 | Jin | H05K 1/113 |
| 2020/0375034 A1* | 11/2020 | Watanabe | H05K 3/0052 |
| 2021/0005578 A1* | 1/2021 | Matsumoto | H01L 23/5384 |
| 2021/0005962 A1* | 1/2021 | Han | H01Q 3/267 |
| 2021/0066791 A1* | 3/2021 | Park | H01Q 1/246 |
| 2021/0104475 A1* | 4/2021 | Radhakrishnan | H01L 24/16 |
| 2021/0168935 A1* | 6/2021 | Lin | H01L 23/5225 |
| 2022/0029309 A1* | 1/2022 | Boyes | H01Q 9/285 |
| 2023/0067193 A1* | 3/2023 | Liu | H01P 1/2088 |
| 2023/0307831 A1* | 9/2023 | Li | H01Q 3/32 |
| 2024/0275028 A1* | 8/2024 | Huang | H01Q 19/104 |

* cited by examiner

ANTENNA ASSEMBLY AND BASE STATION ANTENNA

RELATED APPLICATIONS

This patent application claims priority to and the benefit of Chinese Patent Application Serial Number 202010191740.3 filed Mar. 18, 2020, the content of which is hereby incorporated by reference as if recited in full herein.

FIELD

The present invention generally relates to radio communications and, more particularly, to antenna assemblies and base station antennas.

BACKGROUND

Due to the growing demand for wireless communications, multi-band base station antennas, Multiple-Input Multiple-Output (MIMO) technology, and beamforming technology have been rapidly developed to support different services and massive data transmission. However, with the integration of more and more frequency bands and RF ports in one base station antenna, the layout of the feed networks and the wiring of cables become more complicated. Therefore, how to achieve high integration and miniaturization of the overall antenna construction has been a technical problem urgently to be solved by those skilled in the art.

SUMMARY

A first aspect of the present invention is directed to an antenna assembly that includes a feed board, a backplane, and a calibration board. A plurality of radiating elements are mounted on the feed board and extend forwardly from the feed board. The feed board is mounted on a first major surface of the backplane, and the calibration board is mounted on a second major surface of the backplane opposite the first major surface. The antenna assembly further includes a conductive structure which extends through openings in at least two of the feed board, the backplane and the calibration board so as to electrically connect a first transmission line on the calibration board with a second transmission line on the feed board.

Embodiments of the present invention configure the antenna assembly to have of a coaxial device between a microstrip calibration circuit and a feeding circuit to provide a connection.

Embodiments of the invention provide an antenna assembly that can achieve high integration and miniaturization of the overall antenna construction.

In some embodiments, the backplane can include a first opening, the feed board can have a second opening corresponding to the first opening, and the calibration board can have a third opening corresponding to the first opening. The conductive structure can extend through the first opening, the second opening, and the third opening.

In some embodiments, the first opening, second opening and the third opening can be at least partially aligned.

In some embodiments, the conductive structure can be a metal conductor.

In some embodiments, the metal conductor can be electrically connected to the first transmission line at one end and electrically connected to the second transmission line at the other end.

In some embodiments, the antenna assembly can further include a dielectric element which can surround the metal conductor within the first opening of the backplane.

In some embodiments, an inner peripheral wall of the backplane can surround and/or define the first opening and the dielectric element and the metal conductor can be mounted in close contact with each other in sequence.

In some embodiments, the conductive structure can be a printed circuit board component.

In some embodiments, the printed circuit board component can include a dielectric layer, a printed trace on a first major surface of the dielectric layer, and a ground metal layer on a second major surface of the dielectric layer.

In some embodiments, the printed trace can be electrically connected to the first transmission line at one end and electrically connected to the second transmission line at the other end.

In some embodiments, the ground metal layer can be electrically connected to a ground region on the feed board at one end and can be electrically connected to a ground region on the calibration board at the other end.

In some embodiments, the backplane can be configured as a reflector of a base station antenna.

According to another aspect of the present invention an antenna assembly can include a feed board, a backplane, and a calibration board. A plurality of radiating elements are mounted on the feed board and extend forwardly from the feed board. The feed board is mounted on a first major surface of the backplane, and the calibration board is mounted on a second major surface of the backplane opposite the first major surface. The antenna assembly further includes a printed circuit board component configured to electrically connect a first transmission line on the calibration board with a second transmission line on the feed board.

In some embodiments, the backplane can include a first opening, the feed board can have a second opening corresponding to the first opening, and the calibration board can have a third opening corresponding to the first opening. The printed circuit board component can be configured to extend through the first opening, the second opening, and the third opening to electrically connect the first transmission line on the calibration board to the second transmission line on the feed board.

In some embodiments, the printed circuit board component can include a dielectric layer, a printed trace on a first side of the dielectric layer, and a ground metal layer on a second side of the dielectric layer.

In some embodiments, the printed trace can be electrically connected to the first transmission line at one end and electrically connected to the second transmission line at the other end.

In some embodiments, the ground metal layer can be electrically connected to a ground region on the feed board at one end and can be electrically connected to a ground region on the calibration board at the other end.

According to a third aspect of the present invention, an antenna assembly includes a feed board, a reflector as a ground structure, and a calibration board. A plurality of radiating elements are mounted on the feed board and extend forwardly from the feed board, wherein the feed board is mounted on a first major surface of the reflector, and the calibration board is mounted on a second major surface of the reflector opposite the first major surface. The antenna assembly further includes a metal conductor and a dielectric element. The reflector includes a first opening. The dielectric element is disposed to surround the metal conductor within the first opening of the reflector and the dielectric element directly contacts the reflector. The metal conductor is configured to extend through the first opening to electrically connect a first transmission line on the calibration board with a second transmission line on the feed board.

In some embodiments, an inner peripheral wall of the reflector formed due to the first opening, the dielectric element, and the metal conductor are in close contact with each other in sequence.

In some embodiments, the feed board can have a second opening corresponding to the first opening, and the calibration board can have a third opening corresponding to the first opening. The metal conductor can be configured to extend through the first opening, the second opening and the third opening to electrically connect a first transmission line on the calibration board with a second transmission line on the feed board.

According to a fourth aspect of the present invention, an antenna assembly includes a feed board, a reflector, and a calibration board. A plurality of radiating elements are mounted on the feed board and extend forwardly from the feed board. The feed board, the reflector, and the calibration board are in close contact with each other in sequence.

In some embodiments, the feed board can be mounted on a first major surface of the reflector and the calibration board can be mounted on a second major surface of the reflector opposite the first major surface.

In some embodiments, the antenna assembly can further include a conductive structure configured to electrically connect the calibration board with the feed board without going through a coaxial device.

According to a fifth aspect of the present invention, there is a base station antenna with a radome and an antenna assembly of any of the described and/or shown embodiments mounted in the radome.

BRIEF DESCRIPTION OF THE DRAWINGS

The present invention will be explained in more detail below by specific embodiments with reference to the accompanying drawings. The schematic drawings are briefly described as follows:

FIG. 5b is a schematic exploded view of FIG. 5a;

FIG. 6b is a schematic exploded view of FIG. 6a.

DETAILED DESCRIPTION

The present invention will be described below with reference to the drawings, in which several embodiments of the present invention are shown. It should be understood, however, that the present invention may be implemented in many different ways and is not limited to the example embodiments described below. In fact, the embodiments described hereinafter are intended to make a more complete disclosure of the present invention and to adequately explain the scope of the present invention to a person skilled in the art. It should also be understood that the embodiments disclosed herein can be combined in various ways to provide many additional embodiments.

In the drawings, the same reference signs present the same elements. In the drawings, for the sake of clarity, the sizes of certain features may be modified.

It should be understood that the wording in the specification is only used for describing particular embodiments and is not intended to limit the present invention. All the terms used in the specification (including technical and scientific terms) have the meanings as normally understood by a person skilled in the art, unless otherwise defined. For the sake of conciseness and/or clarity, well-known functions or constructions may not be described in detail.

The singular forms "a/an" and "the" as used in the specification, unless clearly indicated, all contain the plural forms. The words "comprising", "containing" and "including" used in the specification indicate the presence of the claimed features, but do not preclude the presence of one or more additional features. The wording "and/or" as used in the specification includes any and all combinations of one or more of the relevant items listed. As used herein, phrases such as "between X and Y" and "between about X and Y" should be interpreted to include X and Y. As used herein, phrases such as "between about X and Y" mean "between about X and about Y". As used herein, phrases such as "from about X to Y" mean "from about X to about Y."

In the specification, when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being "directly on", "directly attached" to, "directly connected" to, "directly coupled" with or "directly contacting" another element, there are no intervening elements present. In the specification, references to a feature that is disposed "adjacent" another feature may have portions that overlap, overlie or underlie the adjacent feature.

In the specification, words describing spatial relationships such as "up", "down", "left", "right", "forth", "back", "high", "low" and the like may describe a relation of one feature to another feature in the drawings. It should be understood that these terms also encompass different orientations of the apparatus in use or operation, in addition to encompassing the orientations shown in the drawings. For example, when the apparatus in the drawings is turned over, the features previously described as being "below" other features may be described to be "above" other features at this time. The apparatus may also be otherwise oriented (rotated 90 degrees or at other orientations) and the relative spatial relationships will be correspondingly altered.

The antenna assemblies according to embodiments of the present invention are applicable to various types of base station antennas, for example beamforming antennas. In beamforming antennas, due to uncontrollable errors in the design, manufacture or use of RF control systems (such as a remote radio unit or "RRU") or antenna feed networks, a calibration circuit is typically required to compensate for the phase differences and/or amplitude differences of the RF signals that are input at different RF ports. This process is often referred to as "calibration".

Typically, an antenna array and feeding circuits therefor may be integrated on a first printed circuit board as a feed board, while the calibration device is configured as a second printed circuit board placed separately from the first printed circuit board. The feed board may typically be mounted on a first backplane. With the structural strength taken into account, the calibration device also needs to be mounted on a second backplane placed separately from the first backplane. The "backplane" may be any suitable form of plate, such as a metal plate. For the purpose of calibration, a well-known coaxial device may be mounted on the second backplane for electrically connecting a microstrip calibration circuit on the calibration device with the feeding circuit on the feed board. Further, an additional connection device is required to mount the first backplane and the second backplane together. In the mounted state, the first backplane and the second backplane are placed facing each other and spaced apart from each other. However, such connection solution by means of the coaxial device may bring one or more of the following problems: First, the coaxial devices may occupy a large space within the antenna, which may increase the difficulty in the overall design and wiring of the antenna system. Second, it may be time-consuming to install the coaxial devices and the likelihood of installation errors may be increased. Third, the cost of the coaxial devices and the installation costs may increase the overall cost of the antenna. Fourth, there is a relatively strict requirement for the flatness of the first and second backplanes, otherwise the return loss and passive intermodulation performance (PIM) of the antenna may be negatively affected. Fifth, the structural strength can be reduced and/or is low, since the first and second backplanes are mounted spaced apart from each other.

The antenna assembly according to embodiments of the present invention can avoid the connection solution by means of a coaxial device between the microstrip calibration circuit and the feeding circuit. Further, the antenna assembly according to embodiments of the present invention can also achieve high integration and miniaturization of the overall antenna construction.

Embodiments of the present invention will now be described in more detail with reference to the accompanying drawings.

Figure 1:
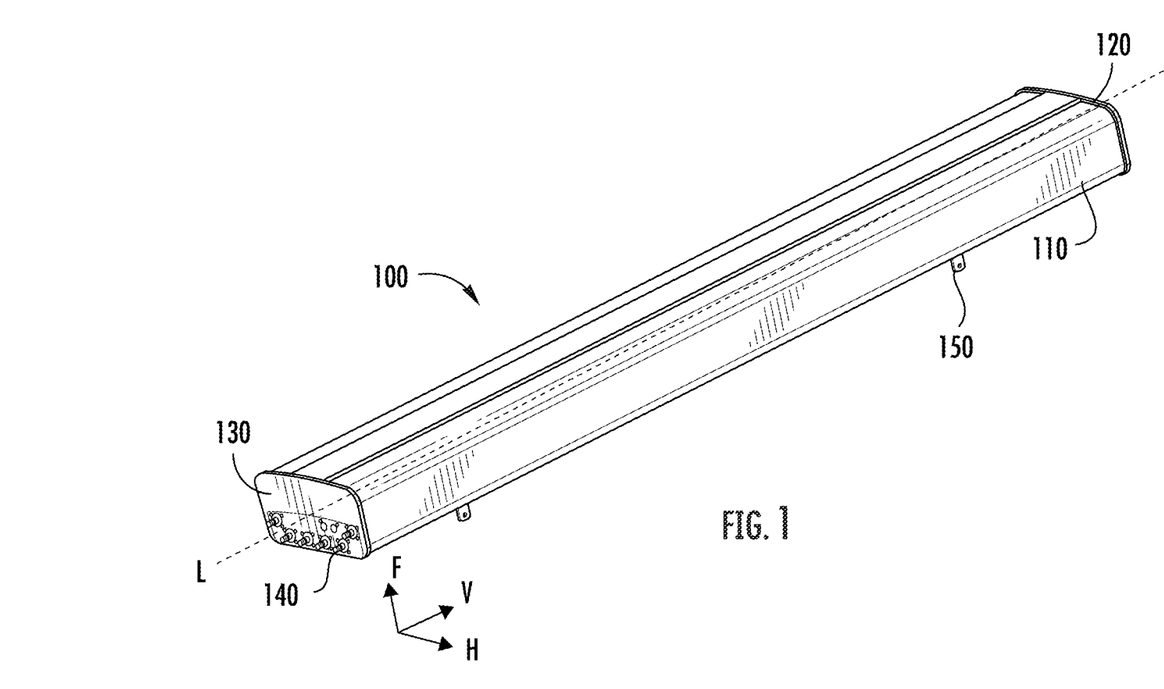
FIG. 1 is a schematic perspective view of a base station antenna according to some embodiments of the present invention.
Figure 2:
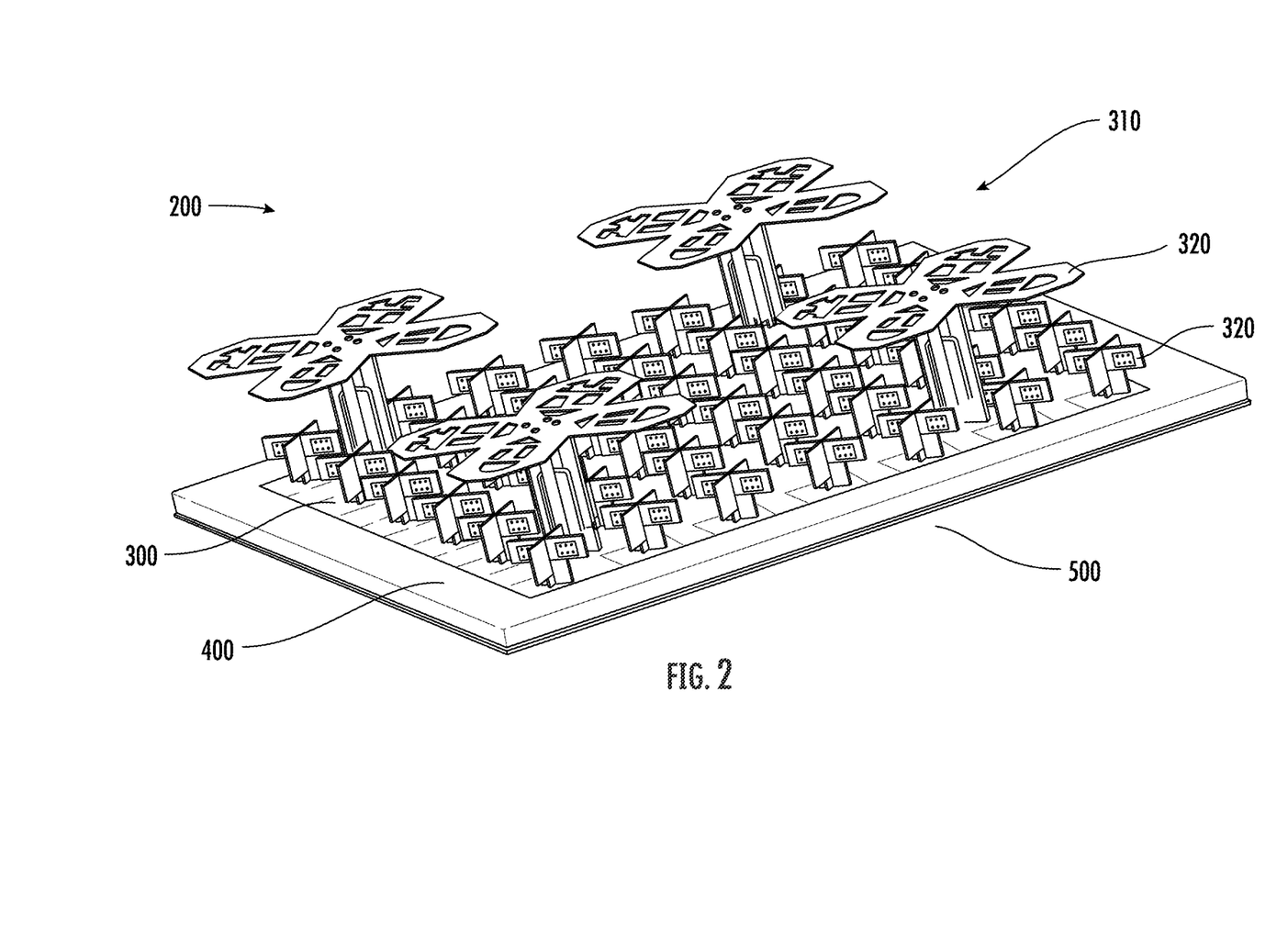
FIG. 2 is a schematic perspective view of an antenna assembly according to some embodiments of the present invention.

Referring to FIGS. 1 and 2, FIG. 1 is a schematic perspective view of a base station antenna 100 according to some embodiments of the present invention, and FIG. 2 is a schematic perspective view of an antenna assembly 200 according to some embodiments of the present invention.

As shown in FIG. 1, the base station antenna 100 is an elongated structure that extends along a longitudinal axis L. The base station antenna 100 may have a tubular shape with a generally rectangular cross-section. The base station antenna 100 includes a radome 110 and a top end cap 120. In some embodiments, the radome 110 and the top end cap 120 may comprise a single integral unit, which may be helpful for waterproofing the base station antenna 100. One or more mounting brackets 150 are provided on the rear side of the radome 110 which may be used to mount the base station antenna 100 onto an antenna mount (not shown) on, for example, an antenna tower. The base station antenna 100 also includes a bottom end cap 130 which includes a plurality of connectors 140 mounted therein. The base station antenna 100 is typically mounted in a vertical configuration (i.e., the longitudinal axis L may be generally perpendicular to a plane defined by the horizon when the base station antenna 100 is mounted for normal operation).

As shown in FIG. 2, the base station antenna 100 includes an antenna assembly 200 that may be slidably inserted into the radome 110. The antenna assembly 200 includes a feed board 300, a backplane 400, and a calibration board 500 (not visible as it is underneath the backplane 400 in the view of FIG. 2). In the embodiment shown in FIG. 2, the feed board 300 is mounted on a first major surface of the backplane 400, and the calibration board 500 is mounted on a second major surface of the backplane 400 opposite the first major surface.

In some embodiments, the feed board 300, the backplane 400, and the calibration board 500 may be mounted in abutment against each other in sequence without the presence of a large gap, particularly a gap brought by the use of coaxial devices. In this text, the coaxial device may be a coaxial connector or a coaxial cable. The gap therebetween may be, for example, less than the thickness of any of the feed board 300, the backplane 400 and the calibration board 500. The feed board 300 may be at least partially abutted against the first major surface of the backplane 400, and the calibration board 500 may be at least partially abutted against the second major surface of the backplane 400. Additionally, the feed board 300, the backplane 400 and the calibration board 500 may be mounted together by other fastening means such as bayonet connection, screw connection, rivet connection, welding and/or adhering.

In some embodiments, the feed board 300, the backplane 400, and the calibration board 500 may be placed in close contact with each other in sequence, that is, there is almost no gap therebetween. For installation, an adhesive layer, a fastening device, or the like may be applied therebetween. Therefore, the feed board 300, the backplane 400, and the calibration board 500 can be tightly integrated with each other.

The aforesaid assembly solutions of the feed board 300, the backplane 400 and the calibration board 500 can not only reduce the space occupied by the antenna assembly 200 within the antenna, thereby improving the integration of the overall antenna construction, but can also reduce the number of backplanes 400, for example, to only one backplane 400, thereby reducing manufacturing costs, weight and the overall size of the antenna. Further, in the case where only one backplane 400 is required, the strict requirement for flatness of the first backplane and the second backplane may be avoided.

An antenna array 310 including a plurality of radiating elements 320 may be mounted on the feed board 300, and the radiating elements 320 are mounted to extend forwardly (in a forward direction F) from the backplane 400. The backplane 400 may be configured as a reflector of the base station antenna 100. The reflector may be used as a ground plane structure for the radiating elements 320. The reflector may be made of an electrically conductive material, such as copper, aluminum, etc.

The antenna arrays 310 may be, for example, linear arrays of radiating elements 320 or two-dimensional arrays of radiating elements 320. The plurality of radiating elements 320 may include low-band radiating elements and high-band radiating elements, and the low-band radiating elements extend farther forward than the high-band radiating elements. The low-band radiating elements may be configured to transmit and receive RF signals in a first frequency band such as, for example, the 617-960 MHz frequency range or a portion thereof. The high-band radiating elements may be configured to transmit and receive RF signals in a second frequency band such as, for example, the 2.5-2.7 GHz frequency range, the 3.4-3.8 GHz frequency range and/or the 5.1-5.8 GHz frequency range or a portion (or portions) thereof. Dual-polarized radiating elements are typically used on the modern base station antennas, which transmit and receive RF signals with two orthogonal polarizations.

In some embodiments, the antenna arrays 310 may extend substantially along the entire length of the base station antenna 100. In other embodiments, the antenna arrays 310 may also extend only partially along the length of the base station antenna 100. The antenna arrays 310 may extend in a vertical direction V, which may be the direction of a longitudinal axis L of the base station antenna 100 or may be parallel to the longitudinal axis L. The vertical direction V is perpendicular to a horizontal direction H and a forward direction F (see FIG. 1).

Figure 3:
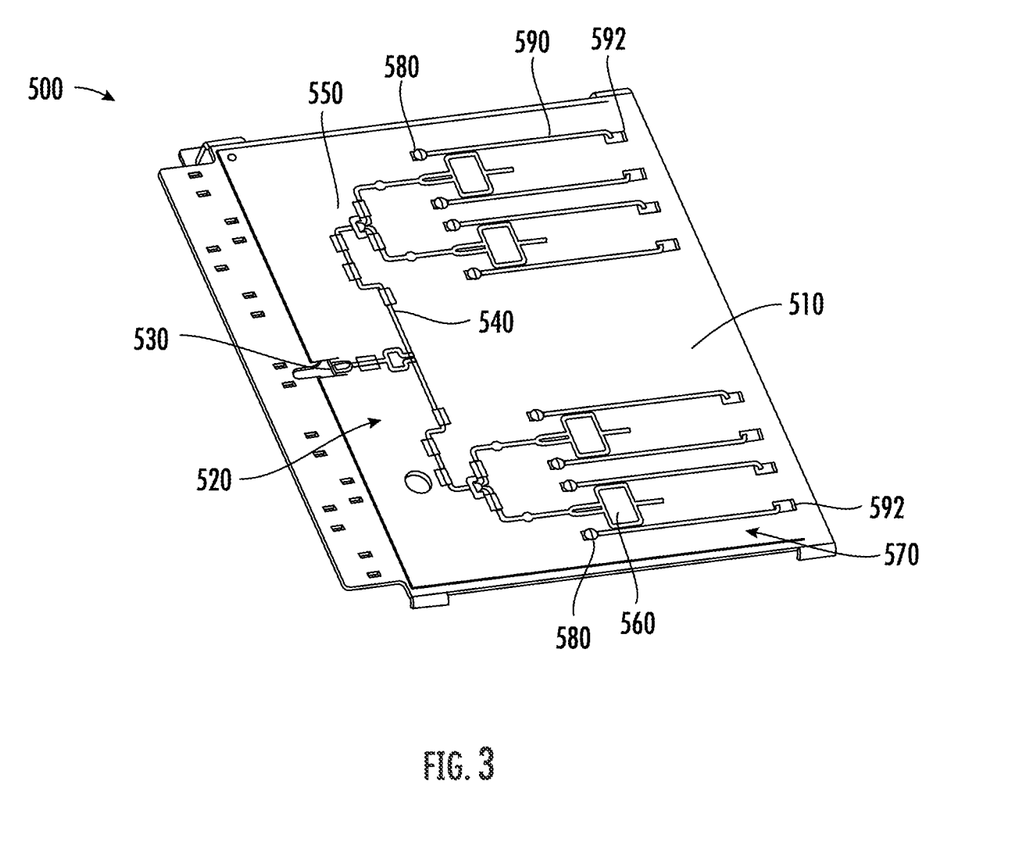
FIG. 3 is a simplified schematic view of a calibration board for the antenna assembly of FIG. 2.
Figure 4:
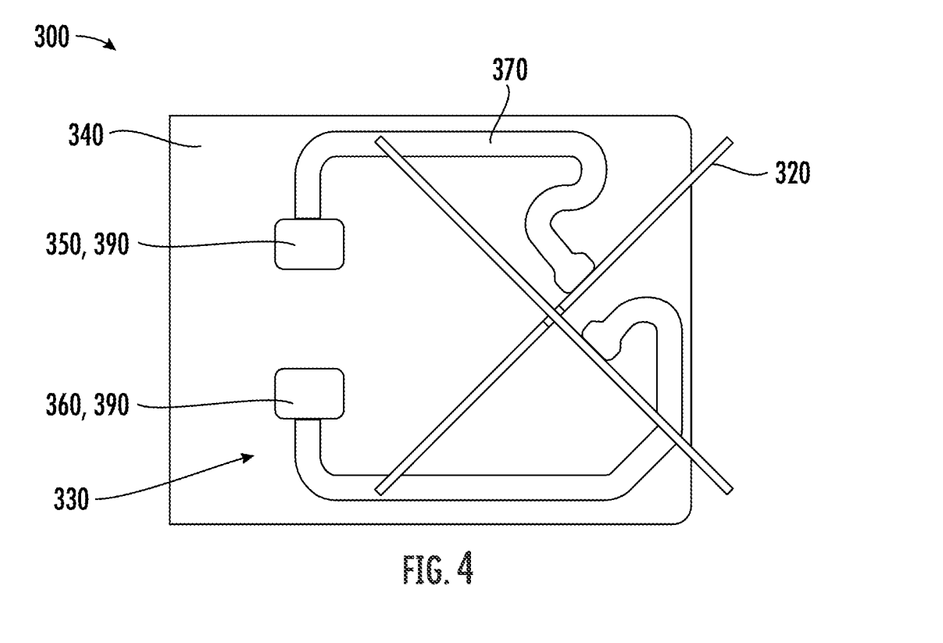
FIG. 4 is a simplified schematic view of a feed board for the antenna assembly of FIG. 2.

Next, the feed board 300 and the calibration board 500 of the antenna assembly 200 according to embodiments the present invention will be further described with reference to FIGS. 3 and 4, wherein FIG. 3 is a simplified schematic view of the calibration board 500 for the antenna assembly 200, and FIG. 4 is a simplified schematic view of the feed board 300 for the antenna assembly 200.

As shown in FIG. 3, the calibration board 500 may be configured as a printed circuit board, which may include, for example, a dielectric substrate 510, a microstrip calibration circuit 520 disposed on a first major surface of the dielectric substrate 510, and a ground metal layer (not shown) disposed on a second major surface of the dielectric substrate 510. In some embodiments, the microstrip calibration circuit 520 may be implemented in a multi-layer printed circuit board including two dielectric substrates, wherein a first ground metal layer may be disposed on an upper surface of the upper dielectric substrate, a second ground metal layer may be disposed on a lower surface of the lower dielectric substrate, and the calibration circuit 520 is provided in a metal layer between the two dielectric substrates. As a result, the calibration circuit 520 is surrounded by the first and second ground metal layers and may thus constitute a stripline network. The stripline network may be advantageous in that it can reduce losses of radiation signals and protect RF transmission lines from external radiation. In some embodiments, the calibration board 500 may include, for example, two or more printed circuit boards, which may be electrically connected to each other via cables.

The calibration circuit 520 may include a calibration port 530, transmission lines 540, power divider/combiners 550, and couplers 560. The power divider/combiners 550 may be configured as Wilkinson power dividers/combiners. The couplers 560 may be configured as directional couplers 560. The calibration circuit 520 may be used to identify any unintended variations in the amplitude and/or phase of the RF signals that are input to the different RF ports 580 of the antenna.

In some embodiments, a remote radio unit (RRU) (not shown) may input a calibration signal to the calibration port 530 via a cable. Then, the calibration signal is passed from the calibration port 530 via the respective transmission lines 540 to the power dividers 550 which divide the calibration signal into a plurality of sub-components. The sub-components of the calibration signal are passed by the respective couplers 560 to the respective feed branches 570. The feed branches 570 may each include an RF port 580 and a feeding line (hereinafter referred to as a first transmission line 590). The RF ports 580 may each extract a small portion of the calibration signal by means of the couplers 560. The first transmission lines 590 may be electrically connected to the feeding circuit 330 on the feed board 300 by means of conductive connections, so that the RF signal input by the RRU to the RF port 580 may be further fed to the downstream radiating element 320. The RRU may read the amplitude and/or phase of the RF signals that are electrically coupled from the calibration circuit 520 via the couplers 560 to the RF ports 580. Accordingly, calibration of the RF control system can be implemented in terms of the S parameters of the RF ports 580 and the calibration port 530. In other words, the calibration can be implemented in terms of the amplitude and/or phase of the RF signals coupled to the RF ports 580 and the amplitude and/or phase of the calibration signal at the calibration port 530. The RRU may adjust the amplitude and/or phase of the RF signal to be input to the RF port 580 so as to provide an optimized antenna beam.

In some embodiments, the RRU may first input RF signals into the respective RF ports 580 via cables. Then, the calibration circuit 520 may extract, by means of the couplers 560, a small amount of each of the RF signals from the respective RF ports 580, and then combine these extracted signals to a calibration signal by means of the power combiners 550 and pass the calibration signal back to the RRU that generates the RF signals. The RRU may adjust the amplitude and/or phase of the RF signals to be input to the RF ports 580 according to the calibration signal so as to provide an optimized antenna beam.

It should be understood that the calibration board 500 and the calibration circuit 520 may include any suitable configuration and/or working mode and are not limited to the embodiments described above.

Refer to FIG. 4, which only exemplarily shows one radiating element 320 and a feeding circuit 330 therefor mounted on the feed board 300. The feed board 300 may be configured as a printed circuit board, which may include, for example, a dielectric substrate 340, a microstrip feeding circuit 330 provided on a first major surface of the dielectric substrate 340, and a ground metal layer (not shown) provided on a second major surface of the dielectric substrate 340. The feeding circuit 330 may include a first feeding interface 350, a second feeding interface 360, and associated transmission lines (hereinafter referred to as second transmission lines 370). The feeding circuit 330 is configured to transmit the RF signal received from the RF port 580 to the corresponding radiating element 320, and/or the feeding circuit 330 is configured to transmit the RF signal received from the radiating element 320 to the respective RF port 580. The first feeding interface 350 may feed sub-components of the RF signal with a first polarization to the respective radiating element 320 (or a group of radiating elements), and the second feeding interface 360 may feed sub-components of the RF signal with a second polarization to the respective radiating element 320 (or a group of radiating elements). In order to enable an effective electrical connection of the first transmission line 590 on the calibration board 500 with the respective feeding interfaces on the feed board 300 and further with the second transmission lines 370, conductive structures 600, 700 are additionally provided, as will be discussed in further detail below. Next, some effective electrical connections solutions will be exemplarily described in detail with reference to FIGS. 5a, 5b and 6a, 6b.

Figure 5A:
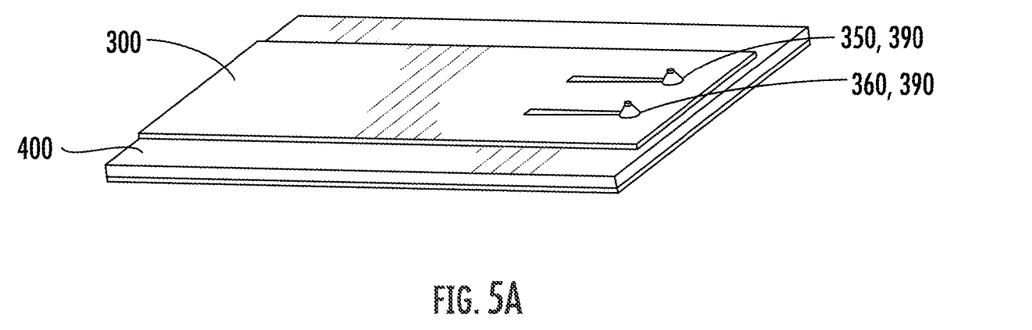
FIG. 5a is a first partial simplified schematic view of the antenna assembly of FIG. 2, showing a first assembly solution of a feed board, a backplane, and a calibration board.
Figure 5B:
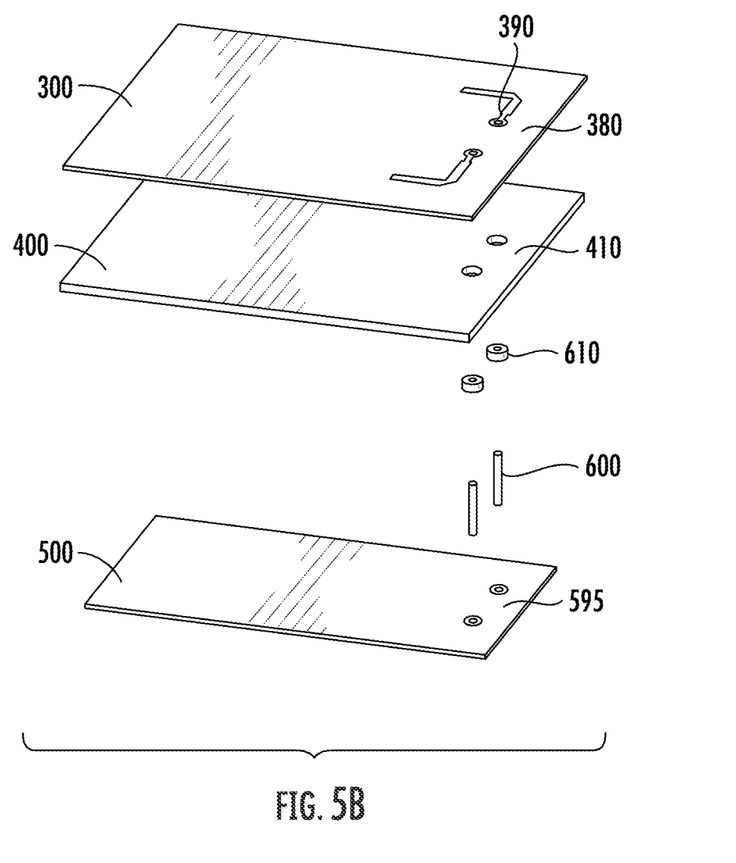

Refer to FIGS. 5a and 5b, which show a first assembly solution of the feed board 300, the backplane 400, and the calibration board 500. In the first assembly solution, the antenna assembly 200 may include a metal conductor 600 as the conductive structure and a dielectric element 610. The metal conductor 600 may be configured as any form of metal elements, such as a copper wire, a copper bar, an aluminum pin, or the like. The dielectric element 610 may be made of any suitable dielectric material, such as mica, ceramic, rubber, paper, polystyrene, or the like. The metal conductor 600 is configured as an impedance-matched transmission line, which may be designed to have an impedance of 50 ohms.

The backplane 400 may include a first opening 410, the feed board 300 has a second opening 380 corresponding to the first opening 410, and the calibration board 500 has a third opening 595 corresponding to the first opening 410. The dielectric element 610 may be disposed within the first opening 410, at least partially surrounding, the metal conductor 600 and electrically isolating the metal conductor 600 from the backplane 400. As shown, the dielectric element 610 may entirely surround the metal conductor 600. A length of the dielectric element 610 is approximately equal to a width/thickness of the backplane 400. An inner peripheral wall of the backplane 400 that defines the first opening 410, the dielectric element 610, and the metal conductor 600 may be abutted against each other in sequence. In this way, the inner peripheral wall of the backplane 400 that defines the first opening 410, the dielectric element 610, and the metal conductor 600 may commonly form an equivalent coaxial cable segment, wherein the inner peripheral wall corresponds to an outer conductor of the coaxial cable, the dielectric element 610 corresponds to an insulating medium of the coaxial cable, and the metal conductor 600 corresponds to an inner conductor of the coaxial cable.

The metal conductor 600 may extend, at one end, through the first opening 410 and the second opening 380 up to the feeding circuit 330 on the feeding board 300, and then be welded (e.g., soldered) to a first welding region 390 (in this way the feed interfaces 350, 360 are formed) to thereby be electrically connected to the second transmission line 370. Further, the metal conductor 600 may extend, at the opposite end, through the first opening 410 and the third opening 595 to the feed branch 570 on the calibration board 500, and then be welded to a second welding region 592 to thereby be electrically connected to the first transmission line 590. In this way, the second transmission line 370 on the feed board 300 is electrically connected to the first transmission line 590 on the calibration board 500. In some embodiments, the backplane 400 may be a reflector of the base station antenna, thereby realizing a common ground between the feed board 300 and the calibration board 500.

In the first assembly solution, since a conventional coaxial device is not used, the gap between the feed board 300 and the backplane 400 and/or the gap between the backplane 400 and the calibration board 500 can be reduced or even eliminated, thereby reducing the size/volume of the antenna assembly 200, which improves the integration of the antenna.

Figure 6A:
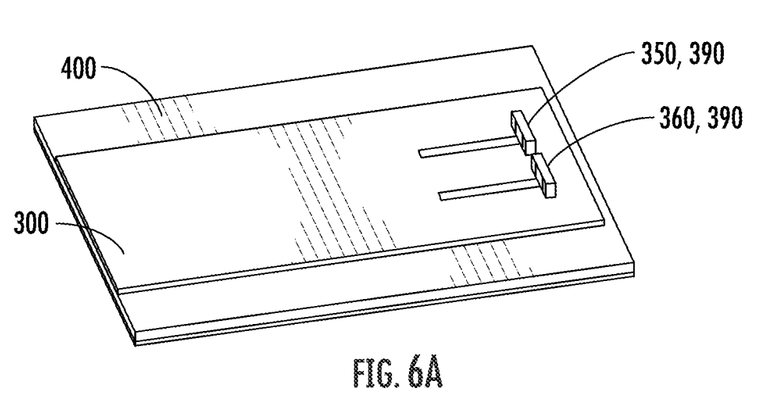
FIG. 6a is a second partial simplified schematic view of the antenna assembly of FIG. 2, showing a second assembly solution of the feed board, the backplane, and the calibration board.
Figure 6B:
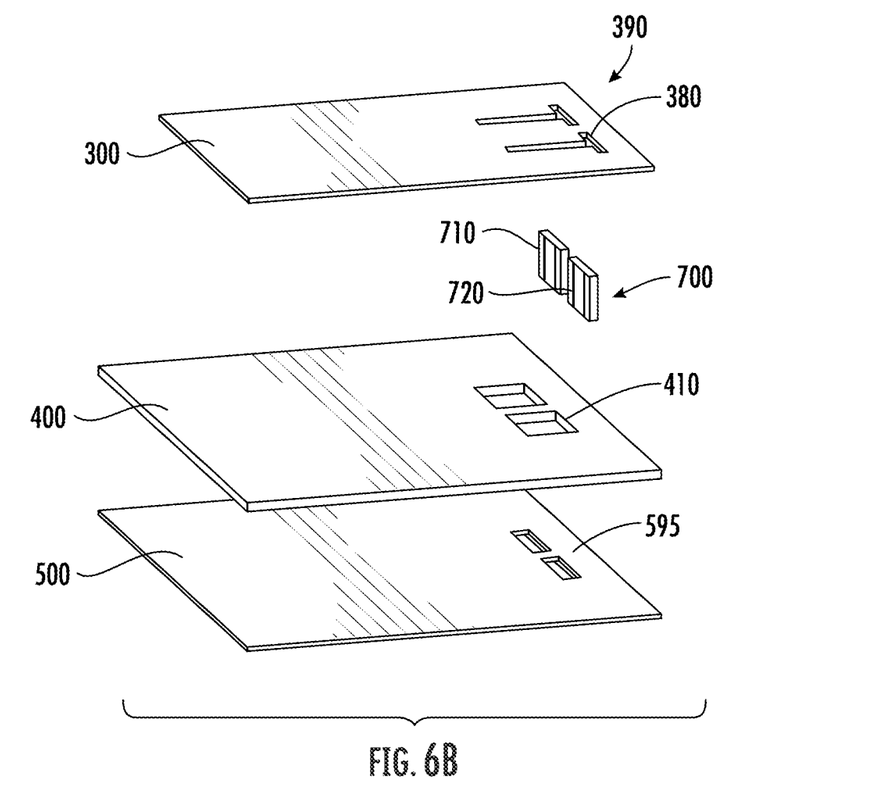

Refer to FIGS. 6a and 6b, which show a second assembly solution for the feed board 300, the backplane 400, and the calibration board 500. In the second assembly solution, the antenna assembly 200 may include a printed circuit board component 700 that includes a dielectric layer 710, a printed trace 720 on a first side of the dielectric layer 710, and a ground metal layer on a second side of the dielectric layer 710. The printed trace 720 is configured as an impedance-matched transmission line segment, which may be designed to have an impedance of 50 ohms.

The backplane 400 may include a first opening 410, the feed board 300 may have a second opening 380 corresponding to the first opening 410, and the calibration board 500 may have a third opening 595 corresponding to the first opening 410. The printed circuit board component 700 may extend, at one end, through the first opening 410 and the second opening 380 up to the feeding circuit 330 on the feeding board 300, and the printed trace 720 of the printed circuit board component 700 may be welded to a first welding region 390 (in this way the feed interfaces 350, 360 are formed) to thereby be electrically connected to the second transmission line 370. The ground metal layer of the printed circuit board component 700 may be electrically connected to a ground region on the feed board 300. Further, the printed trace 720 of the printed circuit board component 700 may extend, at the opposite end, through the first opening 410 and the third opening 595 to the feed branch 570 on the calibration board 500, and then be welded to a second welding region 592 to thereby be electrically connected to the first transmission line 590. The ground metal layer of the printed circuit board component 700 may be electrically connected to a ground region on the calibration board 500. In this way, the second transmission line 370 on the feed board 300 is electrically connected to the first transmission line 590 on the calibration board 500. In some embodiments, the backplane may be a reflector of the base station antenna, thereby realizing a common ground between the feed board 300 and the calibration board 500.

In the second assembly solution, as the RF performance of the printed traces 720 on the printed circuit board component 700 is independent of the backplane 400, the requirement for flatness of the backplane 400 is reduced, thereby reducing manufacturing difficulty and costs. Further, the flatness of the backplane 400 and/or the design accuracy of the first opening 410 of the backplane 400 have almost no effect on the RF performance of the printed circuit board component 700.

Furthermore, since a conventional coaxial device is not used, the gap between the feed board 300 and the backplane 400 and/or the gap between the backplane 400 and the calibration board 500 may be reduced or even eliminated, thereby reducing the size/volume of the antenna assembly 200 and improving the integration of the antenna.

Although exemplary embodiments of the present invention have been described, those skilled in the art should appreciate that many variations and modifications are possible in the exemplary embodiments without materially departing from the spirit and scope of the present invention. Accordingly, all such variations and modifications are intended to be included within the scope of the present invention.

What is claimed is:
1. An antenna assembly, comprising:
a feed board, a backplane, and a calibration board, wherein a plurality of radiating elements are mounted on the feed board and extend forwardly from the feed board, wherein the feed board is mounted on a first major surface of the backplane, and the calibration board is mounted on a second major surface of the backplane opposite the first major surface, wherein the antenna assembly further includes a conductive structure which extends through openings in at least two of the feed board, the backplane and the calibration board so as to electrically connect a first transmission line on the calibration board with a second transmission line on the feed board,
wherein the backplane includes a first opening, the feed board has a second opening corresponding to the first opening, and the calibration board has a third opening corresponding to the first opening, and wherein the conductive structure extends through the first opening, the second opening, and the third opening, and wherein the conductive structure comprises a metal conductor, and wherein the antenna assembly further includes a solid dielectric member which directly contacts the backplane and which surrounds the metal conductor within the first opening of the backplane, wherein the dielectric member is cylindrical with an open center channel and resides only in the first opening of the backplane above the feed board and below the calibration board, wherein the conductive structure extends through the center channel of the dielectric member with the dielectric member held in the first opening of the backplane, and wherein the backplane defines a conductive peripheral wall of the first opening thereby providing a conductive outer conductor for the conductive structure.

2. The antenna assembly according to claim 1, wherein the first opening, second opening and the third opening are at least partially aligned.

3. The antenna assembly according to claim 1, wherein the metal conductor is electrically connected to the first transmission line at one end and electrically connected to the second transmission line at the other end.

4. The antenna assembly according to claim 1, wherein an inner peripheral wall of the backplane that defines the first opening, the dielectric element, and the metal conductor are mounted to be adjacent each other in sequence.

5. The antenna assembly according to claim 1, wherein the conductive structure is a printed circuit board component.

6. An antenna assembly, comprising:
a feed board, a backplane, and a calibration board, wherein a plurality of radiating elements are mounted on the feed board and extend forwardly from the feed board, wherein the feed board is mounted on a first major surface of the backplane, and the calibration board is mounted on a second major surface of the backplane opposite the first major surface, wherein the antenna assembly further includes a conductive structure which extends through openings in at least two of the feed board, the backplane and the calibration board so as to electrically connect a first transmission line on the calibration board with a second transmission line on the feed board,
wherein the backplane includes a first opening, the feed board has a second opening corresponding to the first opening, and the calibration board has a third opening corresponding to the first opening, and wherein the conductive structure extends through the first opening, the second opening, and the third opening,
wherein the conductive structure is a printed circuit board component, and
wherein the printed circuit board component includes a dielectric layer, a printed trace on a first major surface of the dielectric layer, and a ground metal layer on a second major surface of the dielectric layer.

7. The antenna assembly according to claim 6, wherein the printed trace is electrically connected to the first transmission line at one end and electrically connected to the second transmission line at the other end.

8. The antenna assembly according to claim 6, wherein the ground metal layer is electrically connected to a ground region on the feed board at one end and is electrically connected to a ground region on the calibration board at the other end.

9. The antenna assembly according to claim 1, wherein the backplane is configured as a reflector of a base station antenna.

10. An antenna assembly, comprising:
a feed board, a backplane, and a calibration board, wherein a plurality of radiating elements are mounted on the feed board and extend forwardly from the feed board, wherein the feed board is mounted on a first major surface of the backplane, and the calibration board is mounted on a second major surface of the backplane opposite the first major surface, and wherein the antenna assembly further includes a printed circuit board component configured to electrically connect a first transmission line on the calibration board with a second transmission line on the feed board,
wherein the printed circuit board component includes a dielectric layer, a printed trace on a first side of the dielectric layer, and a ground metal layer on a second side of the dielectric layer.

11. The antenna assembly according to claim 10, wherein the printed trace is electrically connected to the first transmission line at one end and electrically connected to the second transmission line at the other end.

12. The antenna assembly according to claim 10, wherein the ground metal layer is electrically connected to a ground region on the feed board at one end and is electrically connected to a ground region on the calibration board at the other end.

13. An antenna assembly comprising a feed board, a reflector as a ground structure, and a calibration board, wherein a plurality of radiating elements are mounted on the feed board and extend forwardly from the feed board, wherein the feed board is mounted on a first major surface of the reflector, and the calibration board is mounted on a second major surface of the reflector opposite the first major surface, wherein the antenna assembly further includes a metal conductor and a solid dielectric member, wherein the reflector includes a first opening, wherein the dielectric member has a center channel and is disposed to surround the metal conductor within the first opening of the reflector and the dielectric member directly contacts the reflector, and wherein the metal conductor is configured to extend through the first opening to electrically connect a first transmission line on the calibration board with a second transmission line on the feed board, wherein the dielectric member has a height defined between spaced apart first and second ends, wherein the first end of the dielectric member is positioned above the calibration board and the second end of the dielectric member is positioned below the reflector, and wherein the height of the dielectric member is less than a height of the metal conductor.

14. The antenna assembly according to claim 13, wherein an inner peripheral wall of the reflector formed due to the first opening, the dielectric element, and the metal conductor are mounted to be adjacent each other in sequence.

15. The antenna assembly according to claim 13, wherein the feed board has a second opening corresponding to the first opening, and the calibration board has a third opening corresponding to the first opening, wherein the metal conductor is configured to extend through the first opening, the second opening and the third opening to electrically connect a first transmission line on the calibration board with a second transmission line on the feed board.

16. The antenna assembly of claim 13, wherein the dielectric member is cylindrical.

* * * * *